(12) United States Patent
Boisson et al.

(10) Patent No.: US 10,094,390 B2
(45) Date of Patent: Oct. 9, 2018

(54) ROTARY ASSEMBLY FOR AN AVIATION TURBINE ENGINE, THE ASSEMBLY COMPRISING A SEPARATE FAN BLADE PLATFORM MOUNTED ON A FAN DISK

(71) Applicant: SNECMA, Paris (FR)

(72) Inventors: Alexandre Bernard Marie Boisson, Moissy-Cramayel (FR); Caroline Jacqueline Denise Berdou, Bures sur Yvette (FR); Thomas Alain De Gaillard, Massy (FR); Matthieu Arnaud Gimat, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 306 days.

(21) Appl. No.: 15/051,106

(22) Filed: Feb. 23, 2016

(65) Prior Publication Data

US 2016/0252102 A1    Sep. 1, 2016

(30) Foreign Application Priority Data

Feb. 26, 2015   (FR) ...................................... 15 51641

(51) Int. Cl.
*F04D 29/32*     (2006.01)
*F04D 29/34*     (2006.01)
(Continued)

(52) U.S. Cl.
CPC ............ *F04D 29/326* (2013.01); *F01D 5/30* (2013.01); *F01D 11/008* (2013.01); *F02C 7/04* (2013.01);
(Continued)

(58) Field of Classification Search
CPC ...... F04D 29/326; F04D 29/329; F04D 29/34; F01D 5/30; F01D 5/3007; F01D 11/005;
(Continued)

(56) References Cited

U.S. PATENT DOCUMENTS

| 6,447,250 B1 * | 9/2002 | Corrigan ............... F01D 5/3007 |
|---|---|---|
| | | 416/193 A |
| 2013/0052012 A1 * | 2/2013 | Kray ..................... F01D 5/3007 |
| | | 416/2 |

(Continued)

FOREIGN PATENT DOCUMENTS

WO   WO 2014/143268 A1   9/2014

OTHER PUBLICATIONS

Search Report as issued in French Patent Application No. 1551641, dated Dec. 17, 2015.

*Primary Examiner* — Logan Kraft
*Assistant Examiner* — Elton Wong
(74) *Attorney, Agent, or Firm* — Pillsbury Winthrop Shaw Pittman LLP

(57) ABSTRACT

A rotary assembly includes a fan disk including a tooth with an upstream face; a platform mounted on the tooth; and a shroud mounted at the upstream end of the disk. The platform, at its upstream end, includes a step with a radial portion that is extended by an axial portion to form a substantially L-shaped longitudinal section. The axial portion radially retains the platform against the tooth. The radial portion extends along the upstream face of the tooth and includes an opening for having a fastener element passing axially therethrough to mount the shroud on the disk. A face of the shroud includes an element that projects and passes through the opening and comes into contact with the upstream face. The element extends from the face of the shroud over a length that is longer than a thickness of the radial portion of the step of the platform.

6 Claims, 6 Drawing Sheets

(51) Int. Cl.
*F01D 5/30* (2006.01)
*F02C 7/04* (2006.01)
*F01D 11/00* (2006.01)

(52) U.S. Cl.
CPC ........... *F04D 29/329* (2013.01); *F04D 29/34* (2013.01); *F05D 2220/36* (2013.01); *F05D 2240/30* (2013.01); *F05D 2240/80* (2013.01)

(58) Field of Classification Search
CPC ........ F01D 11/006; F01D 11/008; F02C 7/04; F05D 2240/80; F05D 2220/36
See application file for complete search history.

(56) References Cited

U.S. PATENT DOCUMENTS

| | | | |
|---|---|---|---|
| 2013/0202449 A1* | 8/2013 | Lombard | ................. F01D 5/02 416/244 R |
| 2015/0125305 A1* | 5/2015 | Duelm | ................. F04D 29/023 416/193 A |
| 2015/0337661 A1* | 11/2015 | Alarcon | ................. F01D 5/025 416/245 R |

* cited by examiner

ROTARY ASSEMBLY FOR AN AVIATION TURBINE ENGINE, THE ASSEMBLY COMPRISING A SEPARATE FAN BLADE PLATFORM MOUNTED ON A FAN DISK

CROSS-REFERENCE TO RELATED APPLICATIONS

This application claims priority to French Patent Application No. 15 51641, filed Feb. 26, 2015, the entire content of which is incorporated herein by reference in its entirety.

FIELD

The present invention relates to the general field of aviation turbine engines, and more precisely to the field of separate fan blade platforms that are fitted to an aviation turbine engine.

BACKGROUND

In a turbine engine, fan blade platforms need to perform several functions. From an aerodynamic point of view, such platforms serve primarily to define the air flow passage. They must also be capable of withstanding large forces without deforming and while remaining secured to the disk that carries them.

In order to satisfy these various requirements, certain configurations have been proposed in which platforms possess a first portion serving to define the air flow passage and to retain the platform while the engine is rotating, and a second portion serving to limit deformation of the first portion under the effects of centrifugal forces and to hold the platform in position when the engine is stationary.

In existing solutions, the platform may be in the form of a box having a two-dimensional passage wall that is retained downstream by a drum and upstream by a shroud, with upstream retention by the shroud being provided over the tooth of the fan disk (a flange of the shroud serves to block the upstream end of the platform both axially and radially).

Such upstream retention provided over the tooth of the disk by means of a shroud presents the drawback of imposing a large hub ratio, where the hub ratio is the ratio of the radius measured between the axis of rotation and the point of the leading edge of the blade that is flush with the surface of the platform, over the radius measured between the axis of rotation and the outermost point of the leading edge.

In order to optimize the performance of the fan, and more generally of the engine, it is desirable to have an assembly obtained by assembling a separate fan blade platform on a fan disk that presents a hub ratio that is as small as possible.

SUMMARY

A main aspect of the present invention is thus to reduce the hub ratio by proposing a rotary assembly for an aviation turbine engine, the assembly comprising:
a fan disk comprising at least one tooth with an upstream face;
at least one platform mounted on the tooth of the fan disk; and
a shroud mounted at the upstream end of the fan disk.

In accordance with one or more embodiments of the invention, at its upstream end, the platform includes a step with a radial portion that is extended by an axial portion giving the step a longitudinal section that is substantially L-shaped, the axial portion being for radially retaining the platform against the tooth of the disk, the radial portion extending along the upstream face of the tooth of the disk and including an opening for having a fastener element passing axially therethrough to mount the shroud on the fan disk. A face of the shroud facing the upstream face of the disk tooth includes an element that projects from the face of the shroud, the element passing through the opening and coming into contact with the upstream face of the tooth of the disk, the element extending from the face of the shroud over a length that is longer than a thickness of the radial portion of the step of the platform.

This assembly, which is applicable to any type of separate platform for an aviation turbine engine fan (e.g. a platform having or not having a box) makes it possible to reduce the hub ratio by retaining the platform radially upstream from the tooth of the fan disk (in other words in front of the tooth of the disk). The step of the platform having its radial portion running along the upstream face of the tooth of the disk then presents an axial portion that serves to retain the platform radially.

This mounting is made possible in particular because the step of the platform presents an opening that enables the shroud to be fastened to the disk, this fastening taking place without involving the platform. Specifically, since the element projecting from the face of the shroud presents a length that is greater than the thickness of the radial portion of the step, it defines spacing or clearance between the face of the shroud and the platform that makes it possible to avoid constraining the platform when fastening the shroud on the disk and when clamping it in place. This serves to avoid imposing additional stresses on the platform or pinching it between the shroud and the disk, thereby reducing any risk of a platform breaking in the event of ingesting objects, e.g. small birds or blocks of ice.

Furthermore, no additional separate element is needed for retaining the upstream end of the platform radially against the tooth, since it is the axial portion of the step of the platform that provides this retention. This assembly thus leads to a saving in overall weight and also to greater ease of mounting by reducing the number of mounting steps and by reducing the number of separate parts.

In an embodiment, the axial portion of the step of the platform is directed upstream, being situated radially on the inside relative to the shroud so that the platform is retained radially by the shroud.

In a variant, the axial portion of the step of the platform is directed downstream, being situated radially on the inside relative to the fan disk so that the platform is retained radially by the fan disk.

In an embodiment, the opening is a notch formed in the radial portion of the step and extending over its axial portion so as to open out in an end thereof. This configuration makes it possible to leave a degree of freedom, in particular of radial and/or tangential freedom to the platform.

In another embodiment, the opening is a hole formed in the radial portion of the step. Unlike the configuration having a notch, this configuration makes it possible to reduce the movements that are possible for the platform once the shroud has been fastened to the disk.

Another aspect of the invention also provides an aviation turbine engine fan comprising an assembly as described above, in which the fan disk presents at least two teeth defining between them a slot; and at least one blade provided with a root mounted in the slot of the disk.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION

In the present description, the terms "longitudinal", "transverse", "bottom", "top", and their derivatives are defined relative to the main direction of the platform in question; the terms "transverse", "radial", "tangential", "inner", "outer", and their derivatives are defined relative to the main axis of the turbine engine; finally, the terms "upstream" and "downstream" are defined relative to the flow direction of the fluid passing through the turbine engine. Furthermore, unless specified to the contrary, the same reference signs in the various figures designate the same characteristics.

Figure 1:
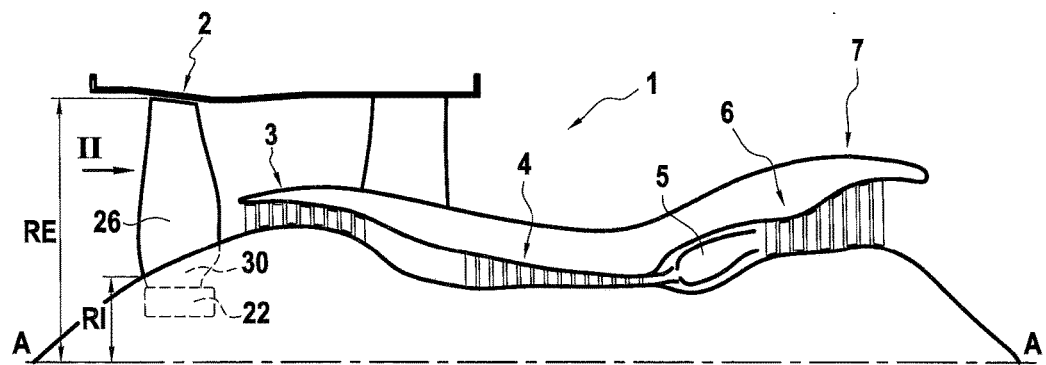
FIG. 1 is a diagrammatic section view of a turbine engine of an embodiment of the invention.

FIG. 1 is a diagrammatic longitudinal section view of a bypass turbojet 1 of the invention centered on an axis A-A. From upstream to downstream it comprises: a fan 2; a low pressure compressor 3; a high pressure compressor 4; a combustion chamber 5; a high pressure turbine 6; and a low pressure turbine 7.

Figure 2:
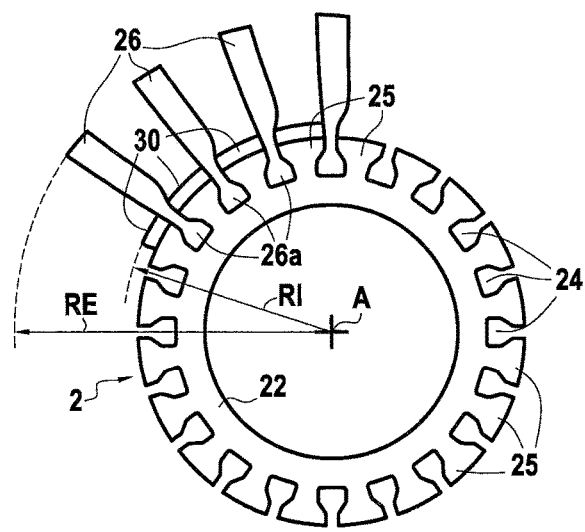
FIG. 2 is a diagrammatic view of the FIG. 1 fan seen looking along arrow II.

FIG. 2 is a diagrammatic view of the fan 2 of FIG. 1 seen looking along arrow II. The fan 2 constituting the subject matter of an embodiment of the present invention comprises a fan disk 22 having a plurality of slots 24 formed in its outer periphery. These slots 24 are rectilinear and extend axially from upstream to downstream all along the disk 22. They are also regularly distributed all around axis A-A of the disk 22. In this way, each slot 24 co-operates with its neighbor to define a tooth 25 that likewise extends axially from upstream to downstream all along the disk 22. In equivalent manner, a slot 24 is defined between two neighboring teeth 25.

The fan 2 also comprises a plurality of blades 26 of curvilinear profile (only four blades 26 are shown in FIG. 2). Each blade 26 possesses a root 26a that is mounted in a respective slot 24 of the fan disk 22. For this purpose, the root 26a of a blade 26 may be Christmas-tree shaped or dovetail-shaped so as to match the shape of the slots 24.

Finally, the fan 2 has a plurality of platforms 30 fitted thereto, each platform 30 being mounted in the gap between two adjacent fan blades 26, in the vicinity of their roots 26a, so as to define the inside of an annular air inlet passage into the fan 2, the passage being defined on the outside by a fan casing.

FIGS. 1 and 2 also show an inner radius RI and an outer radius RE. The inner radius RI corresponds to the radius taken between the axis of rotation A-A and the point of the leading edge of a blade 26 that is flush with the surface of a platform 30. The outer radius RE corresponds to the radius taken between the axis of rotation A-A and the outermost point of the leading edge of a blade 26. These two radii RI and RE are used for calculating the hub ratio RI/RE, and the rotary assembly of the invention seeks to reduce this ratio (by reducing in particular the inner radius RI). In other words, reducing the hub ratio, in particular by acting on the inner radius RI, amounts to bringing the air inlet aerodynamic passage as close as possible to the fan disk.

Figure 3:
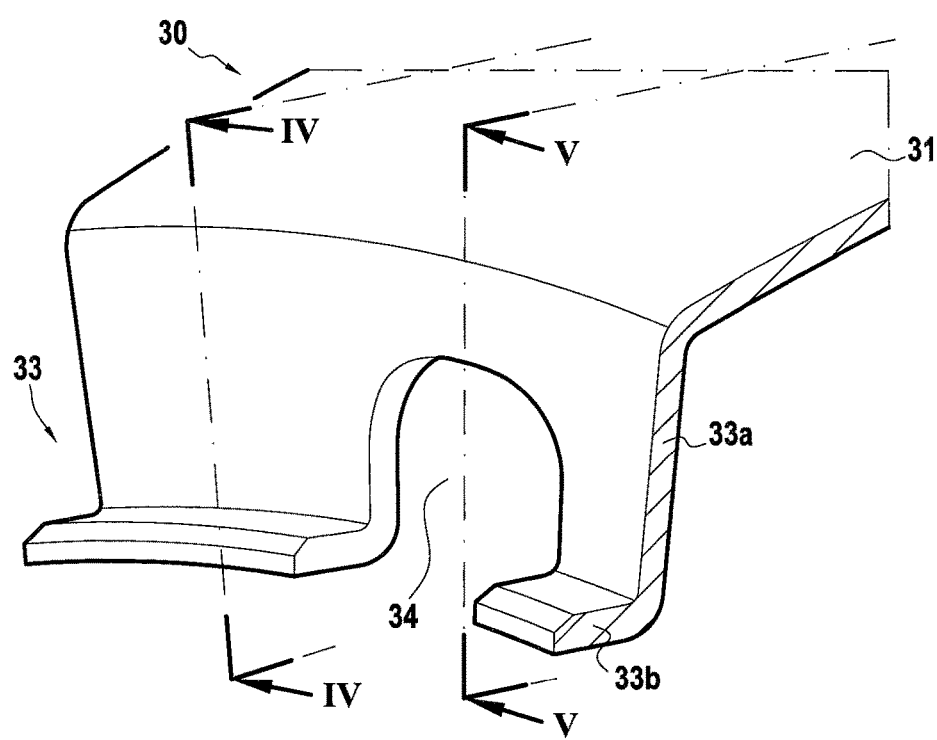
FIG. 3 is a perspective view of the upstream portion of a platform forming a portion of a rotary assembly in an embodiment of the invention.

The upstream portion of a platform 30 for use in a rotary assembly in an embodiment of the invention is shown in perspective in FIG. 3. The platform 30 is in the form of a box having a passage wall 31 forming the top or outer face of the platform 30 and having a sloping profile, and a bottom wall 32 (FIGS. 4A, 5A) that enables the platform 30 to rest on the tooth 25 of the disk 22 when the engine is not in operation.

A step 33 having a longitudinal section that is substantially L-shaped is also shown at the upstream end of the platform 30. The step 33 comprises a radial portion 33a that is extended by an axial portion 33b for providing radial retention of the platform 30 on the tooth of the disk 22. In addition, the step 33 includes an opening which in this example is in the form of a notch 34 formed in the radial portion 33a and extending over the axial portion 33b so as to be open at one end thereof. In a variant, the opening may be in the form of a hole 34" formed in the step 33 of the platform 30" (FIGS. 7A and 7B), depending on whether or not it is desired to leave the platform with both radial and tangential degrees of freedom.

A rotary assembly using a platform 30 as described above with reference to FIG. 3 is described below with reference to FIGS. 4A, 4B, 5A, and 5B. These figures show in greater detail a fan 2 including a rotary assembly in an embodiment of the invention.

Figure 4A:
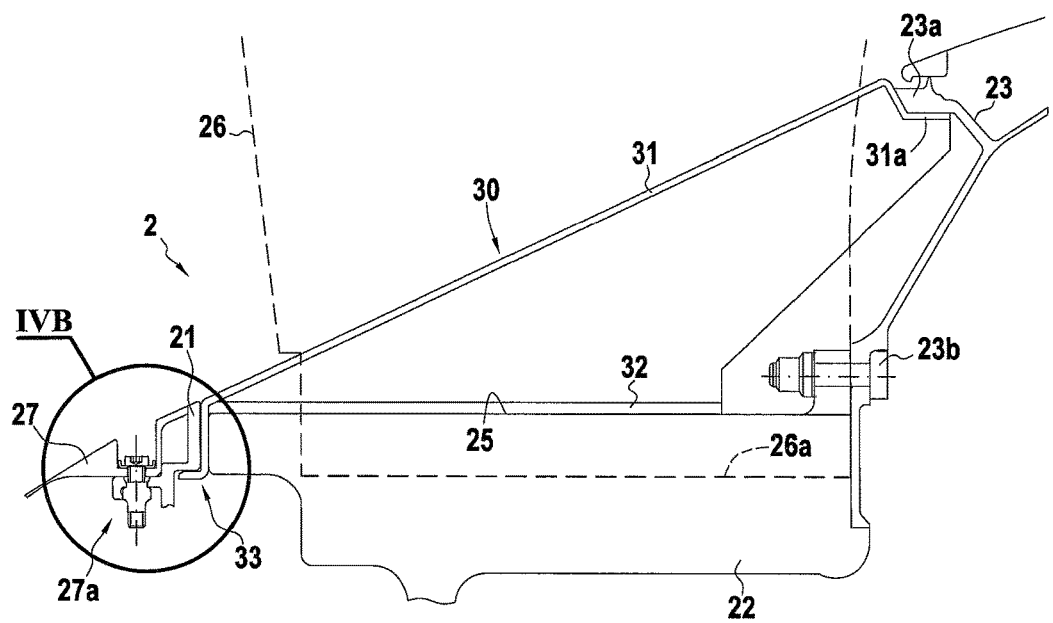
FIGS. 4A and 4B are longitudinal section views on plane IV of the FIG. 3 rotary assembly.
Figure 4B:
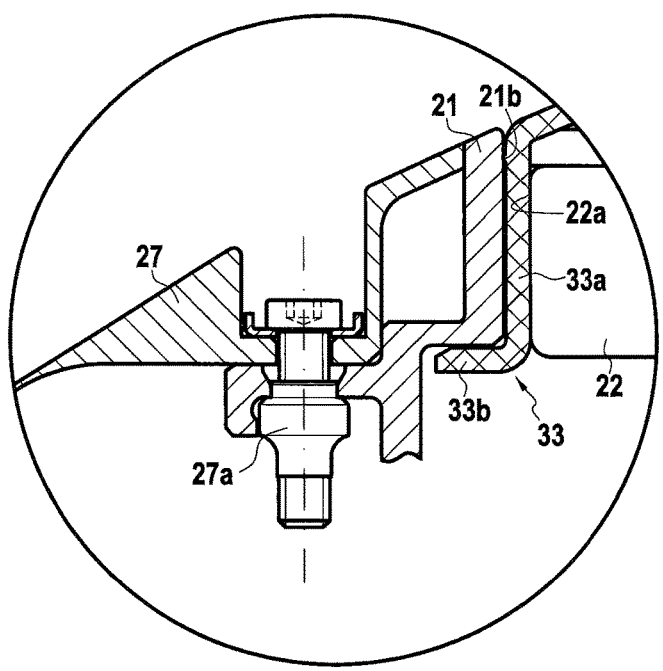
Figure 5A:
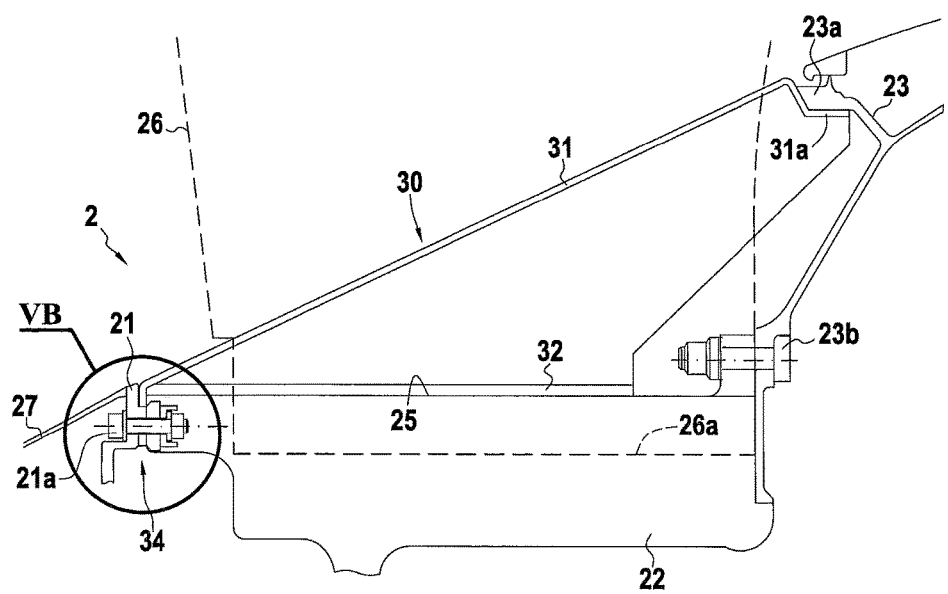
FIGS. 5A and 5B are longitudinal section views on plane V of the FIG. 3 rotary assembly.
Figure 5B:
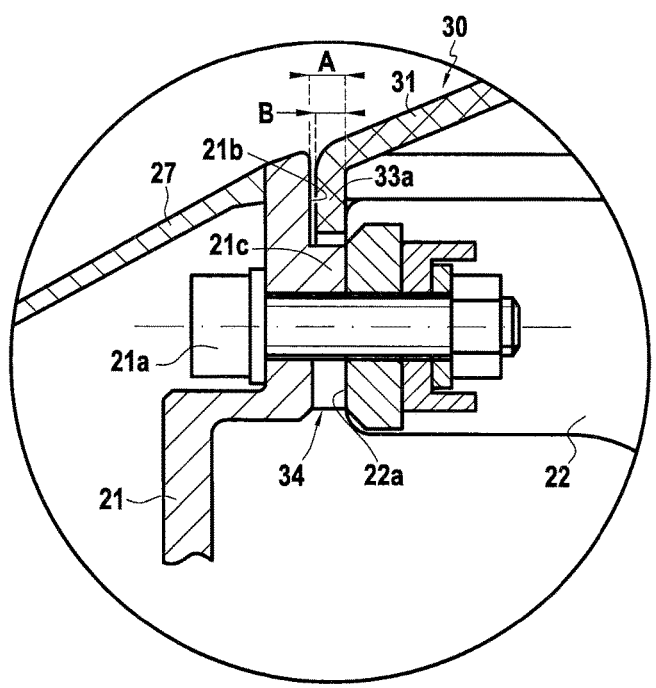

FIGS. 4A and 4B are a longitudinal section view of the fan 2 on plane IV of FIG. 3 through a solid portion of the step 33 of the platform 30; whereas FIGS. 5A and 5B are a longitudinal section view of the fan 2 on a plane V of FIG. 3 through the notch 34 of the platform 30.

In FIG. 4A, there can be seen in particular a fan 2 comprising: an upstream shroud 21; the fan disk 22; a downstream drum 23 (also referred to as a "booster" drum) having a retaining flange 23a for co-operating with a downstream assembly step 31a of the platform 30; and an inlet cone 27 serving to deflect the air stream entering into the turbine engine towards the fan blades 26.

The downstream drum 23 is fastened on the fan disk 22 by fasteners 23b. The shroud is fastened on the fan disk 22 by fasteners 21a (visible in FIGS. 5A and 5B) that pass through the notch 34 in the platform 30, and the inlet cone 27 is fastened to the shroud 21 by fasteners 27a (visible in FIGS. 4A and 4B). As shown in FIG. 5B, an element 21c projects from the front face 21b of the shroud 21 that faces the upstream face 22a of the tooth 25 of the disk 22. This element 21c is in contact with the upstream face 22a of the disk 22 and passes through the notch 34. In this example, the element 21c is in the form of an upside-down U-shape arranged around the fastener 21a and inside the notch 34, without coming into contact with the edges of the notch 34. The element 21c extends from the face 21b of the shroud 21 over a length A that is greater than the thickness B of the radial portion 33a of the platform 30. With the element 21c, there remains clearance, equal to (A-B), between the face 21b of the shroud and the platform 30. In this example, the element 21c serves to define a housing between the tooth 25 of the disk 22 and the shroud 21, in which it is possible to receive the radial portion 33a of the platform. Thus, the shroud 21 can be fastened and clamped to the tooth 25 of the disk 22 without constraining the platform.

The fan disk 22 is coupled to the drive shaft of the low pressure turbine 7 of the engine, such that, in operation, the upstream shroud 21, the fan disk 22, the blades 26, the inlet cone 27, and the downstream drum 23 are driven together in rotation by the low pressure turbine 7. The platforms 30, mounted between the upstream shroud 21 and the downstream drum 23, and held axially by these two elements, are thus likewise driven together in rotation.

In the enlarged view of FIG. 4B, it can be seen that the radial portion 33a of the step 33 of the platform 30 runs along an upstream face 22a of the tooth 25 of the disk 22, and is extended by the axial portion 33b that is directed upstream and that is situated on the inside of the shroud 21. In this configuration, the upstream end of the platform 30 is retained radially against the tooth 25 of the disk 22 by the shroud 21.

Figure 6:
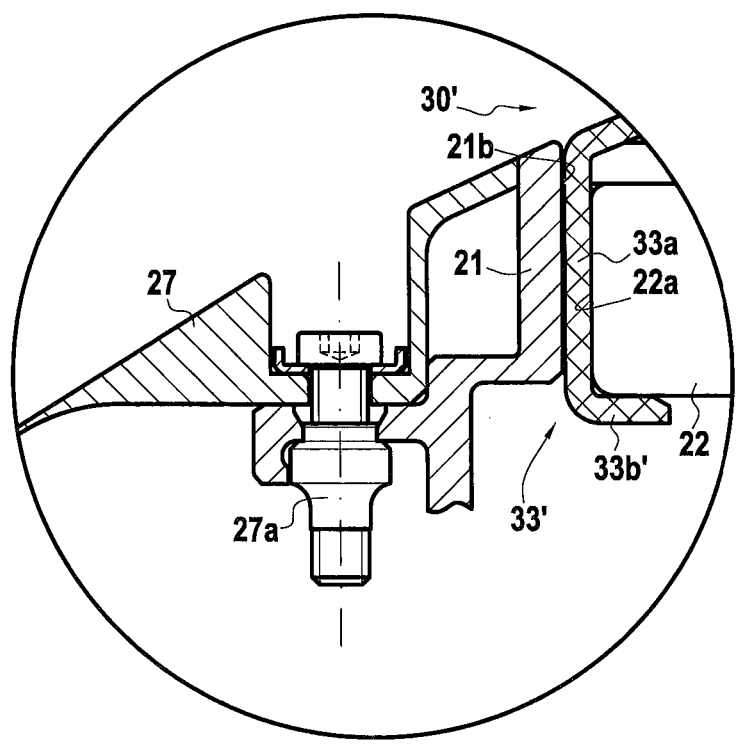
FIG. 6 is an enlarged view in longitudinal section showing a platform assembled on a fan disk in another embodiment of the invention.

In a variant, as can be seen with the platform 30' in FIG. 6, the axial portion 33b' of the step 33' may be directed downstream and situated on the inside relative to the disk 22. In this way, the platform 30' holds a portion of the disk 22 like a vice. In this configuration, the upstream end of the platform 30' is retained radially against the tooth 25 of the disk 22 by the disk 22 itself.

Thus, the upstream ends of the platforms 30, 30', 30" can be retained radially in front of the disk 22 by the shroud 21 or by the disk 22 itself. This makes it possible to reduce the inner radius RI relative to a platform that is retained at its upstream end over the tooth of the disk, and thus makes it possible to reduce the hub ratio RI/RE of the fan 2 of the invention.

Figure 7A:
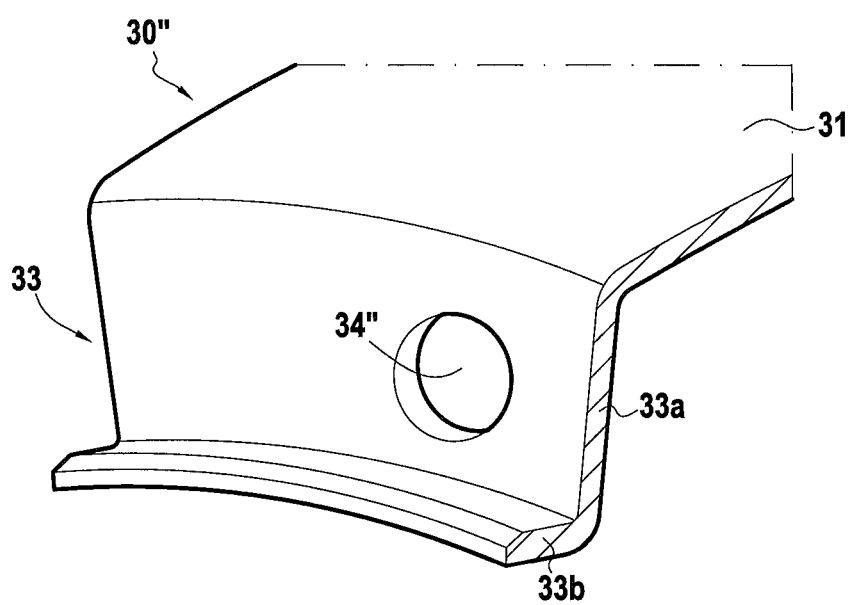
FIGS. 7A and 7B are respectively a perspective view and a longitudinal section view of the corresponding rotary assembly, in yet another embodiment of the invention.
Figure 7B:
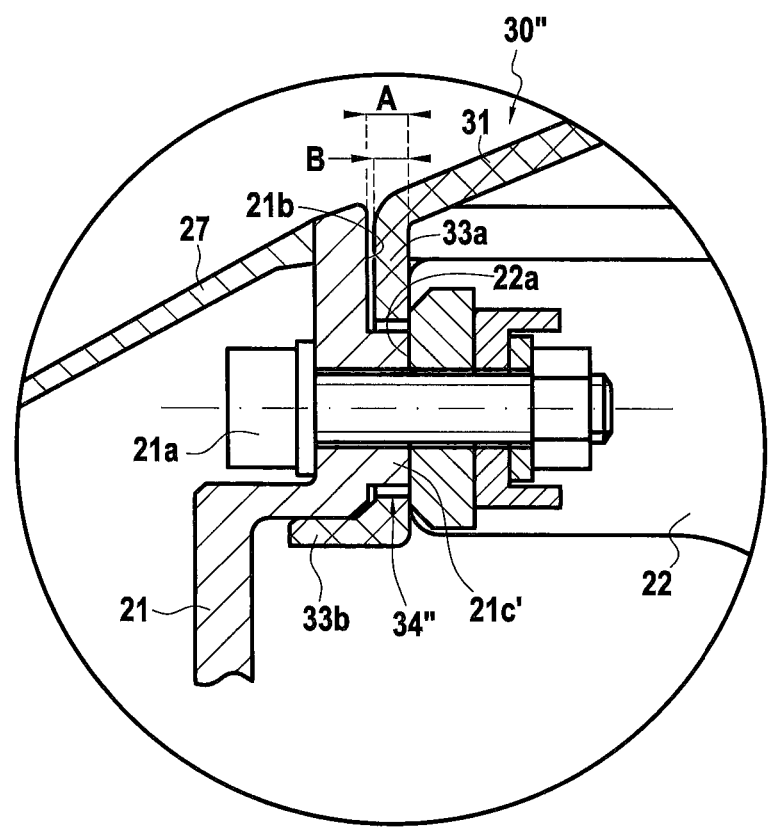

The platform 30" having a hole 34" instead of a notch 34 is shown in FIG. 7A. A rotary assembly including a platform 30" is shown in longitudinal section in FIG. 7B. In this example, the upstream end of the platform 30" is retained radially by the shroud 21.

In a manner similar to the rotary assemblies described above, an element 21c' projects against the face 21b of the shroud 21 facing the upstream face 22a of the tooth 25 of the disk 22 and passes through the hole 34". This element 21c' is in contact with the upstream face 22a of the tooth 25 of the disk 22. In this example, the element 21c' is in the form of a ring that surrounds the fastening 21a and that is positioned inside the hole 34" without coming into contact with the edges of the hole 34". Again as above, the length A of the element 21c' is longer than the thickness B of the radial portion 33a so as to leave clearance (A-B) between the shroud 21 and the platform 30".

It should be observed that the invention is not limited solely to fitted platforms comprising a box shape, and may be applied in particular to platforms that do not include a box shape, and that other combinations of the characteristics of the present invention are also possible.

The invention claimed is:

1. A rotary assembly for an aviation turbine engine, the assembly comprising:
   a fan disk comprising at least one tooth with an upstream face;
   at least one platform mounted on the tooth of the fan disk; and
   a shroud mounted at the upstream end of the fan disk,
   wherein, at the upstream end of the platform, the platform includes a step with a radial portion that is extended by an axial portion giving the step a longitudinal section that is substantially L-shaped, the axial portion being for radially retaining the platform against the tooth of the disk, the radial portion extending along the upstream face of the tooth of the disk and including an opening for having a fastener element passing axially therethrough to mount the shroud on the fan disk, and
   wherein a face of the shroud facing the upstream face of the disk tooth includes an element that projects from said face of the shroud, said element passing through the opening and coming into contact with the upstream face of the tooth of the disk, said element extending from said face of the shroud over a length that is longer than a thickness of the radial portion of the step of the platform.

2. An assembly according to claim 1, wherein the axial portion of the step of the platform is directed upstream, being situated radially on an inside relative to the shroud so that the platform is retained radially by the shroud.

3. An assembly according to claim 1, wherein the axial portion of the step of the platform is directed downstream, being situated radially on the inside relative to the fan disk so that the platform is retained radially by the fan disk.

4. An assembly according to claim 1, wherein the opening is a notch formed in the radial portion of the step and extending over its axial portion so as to open out in an end thereof.

5. An assembly according to claim 1, wherein the opening is a hole formed in the radial portion of the step.

6. An aviation turbine engine fan comprising:
   an assembly according to claim 1 in which the fan disk presents at least two teeth defining between them a slot; and
   at least one blade provided with a root mounted in the slot of the fan disk.

* * * * *